United States Patent
Akiya

(10) Patent No.: US 8,786,978 B2
(45) Date of Patent: Jul. 22, 2014

(54) MAGNETIC DISK DEVICE AND METHOD OF CONTROLLING HEAD POSITION

(75) Inventor: Shinsuke Akiya, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/473,365

(22) Filed: May 16, 2012

(65) Prior Publication Data

US 2013/0194695 A1 Aug. 1, 2013

(30) Foreign Application Priority Data

Jan. 31, 2012 (JP) ................................. 2012-018265

(51) Int. Cl.
*G11B 5/02* (2006.01)

(52) U.S. Cl.
USPC .............................. 360/75; 360/64

(58) Field of Classification Search
USPC .................... 360/55, 63, 64, 75, 77.01, 78.09
See application file for complete search history.

(56) References Cited

U.S. PATENT DOCUMENTS

| | | | |
|---|---|---|---|
| 5,995,318 A * | 11/1999 | Hasegawa et al. | 360/78.14 |
| 6,421,200 B2 * | 7/2002 | Takaishi | 360/78.09 |
| 7,333,287 B2 * | 2/2008 | Hara | 360/77.02 |
| 7,719,788 B2 * | 5/2010 | Tomita | 360/77.07 |
| 2001/0030828 A1 * | 10/2001 | Takaishi | 360/78.14 |
| 2002/0141104 A1 * | 10/2002 | Sato et al. | 360/77.04 |
| 2003/0235002 A1 * | 12/2003 | Takaishi | 360/77.04 |
| 2004/0004783 A1 * | 1/2004 | Takaishi et al. | 360/75 |
| 2006/0268448 A1 * | 11/2006 | Shigematsu | 360/77.04 |
| 2008/0218896 A1 * | 9/2008 | Takaishi et al. | 360/77.02 |
| 2010/0079898 A1 * | 4/2010 | Watanabe | 360/75 |
| 2010/0149674 A1 * | 6/2010 | Tomita | 360/31 |

FOREIGN PATENT DOCUMENTS

| | | |
|---|---|---|
| JP | 03-108167 A2 | 5/1991 |
| JP | 2000-048501 A2 | 2/2000 |
| JP | 2005-353148 A2 | 12/2005 |

* cited by examiner

*Primary Examiner* — Thomas Alunkal

(74) *Attorney, Agent, or Firm* — Knobbe, Martens, Olson & Bear, LLP

(57) ABSTRACT

According to one embodiment, a magnetic disk device includes a reference head select module selects any one of magnetic heads as a reference head; a follow-up controller executes a follow-up control of a trajectory of the reference head based on a signal read by the reference head; and an eccentric controller executes an eccentric control of a trajectory of a magnetic head other than the reference head in order that an eccentric error between the trajectory of the reference head and the trajectory of the corresponding magnetic head is close to zero.

10 Claims, 9 Drawing Sheets

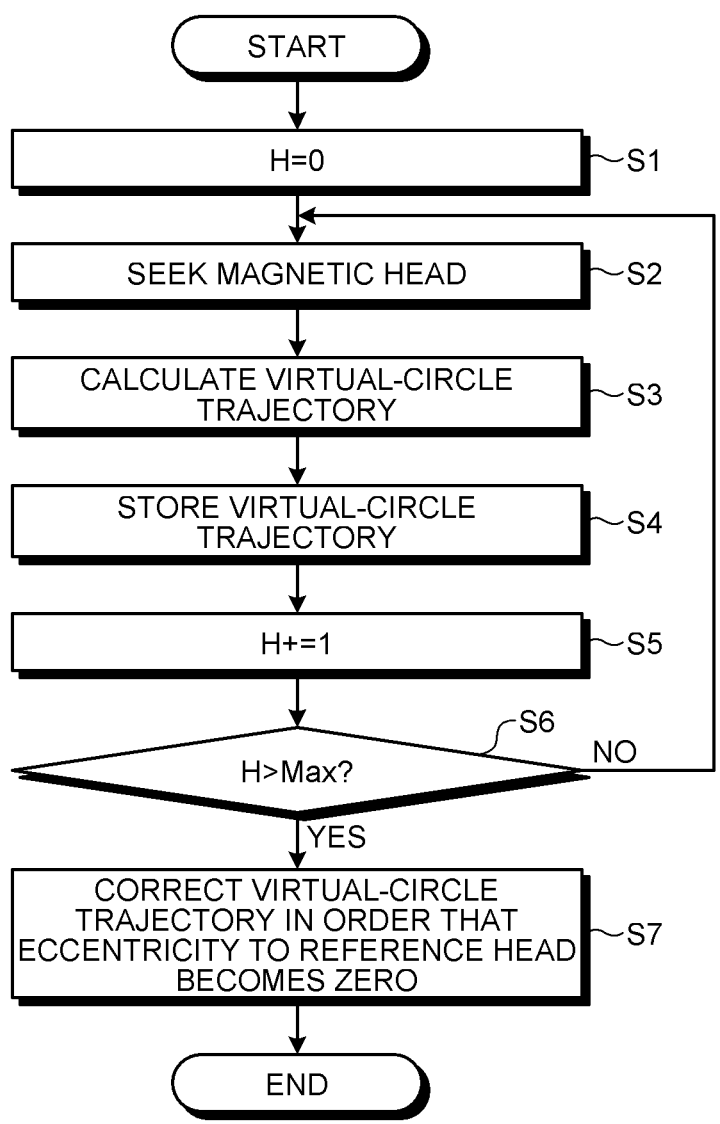

| MAGNETIC HEAD | Z0 | Z1 | Z2 | Z3 |
|---|---|---|---|---|
| H0 | $S_{00}/C_{00}$ | $S_{01}/C_{01}$ | $S_{02}/C_{02}$ | $S_{03}/C_{03}$ |
| H1 | $S_{10}/C_{10}$ | $S_{11}/C_{11}$ | $S_{12}/C_{12}$ | $S_{13}/C_{13}$ |
| H2 | $S_{20}/C_{30}$ | $S_{21}/C_{31}$ | $S_{22}/C_{32}$ | $S_{23}/C_{23}$ |
| H3 | $S_{30}/C_{30}$ | $S_{31}/C_{31}$ | $S_{32}/C_{32}$ | $S_{33}/C_{33}$ |

MAGNETIC DISK DEVICE AND METHOD OF CONTROLLING HEAD POSITION

CROSS-REFERENCE TO RELATED APPLICATIONS

This application is based upon and claims the benefit of priority from Japanese Patent Application No. 2012-018265, filed on Jan. 31, 2012; the entire contents of which are incorporated herein by reference.

FIELD

Embodiments described herein relate generally to a magnetic disk device and a method of controlling a head position.

BACKGROUND

When an eccentric error is generated between magnetic heads in a magnetic disk device having plurality of magnetic heads mounted thereto, this eccentric error causes a positional error or a speed error upon seeking and changing a head. This might increase a seeking time, and deteriorate a seek performance.

A virtual-circle control might be executed in order to eliminate the eccentric error between the magnetic heads. In the virtual-circle control, the trajectory of the magnetic head is controlled so as to form a true circle around a rotation center of the magnetic disk.

BRIEF DESCRIPTION OF THE DRAWINGS

FIG. 4 is a flowchart illustrating a method of calculating the trajectory of each magnetic head in FIG. 1;

DETAILED DESCRIPTION

In general, according to one embodiment, a magnetic disk device includes magnetic disk, plurality of magnetic heads, a reference head select module, a follow-up controller, and an eccentric controller. Each of the magnetic heads is provided for a disk surface of the magnetic disk. The reference head select module selects any one of the magnetic heads as a reference head. The follow-up controller executes a follow-up control of a trajectory of the reference head based upon a signal read on the reference head. The eccentric controller executes an eccentric control of trajectories of the magnetic heads, other than the reference head, in order that an eccentric error between the reference head and the magnetic heads is close to zero.

A magnetic disk device and a method of controlling a head position according to the embodiments will be described below with reference to the drawings. The present invention is not limited to these embodiments.

First Embodiment

Figure 1:
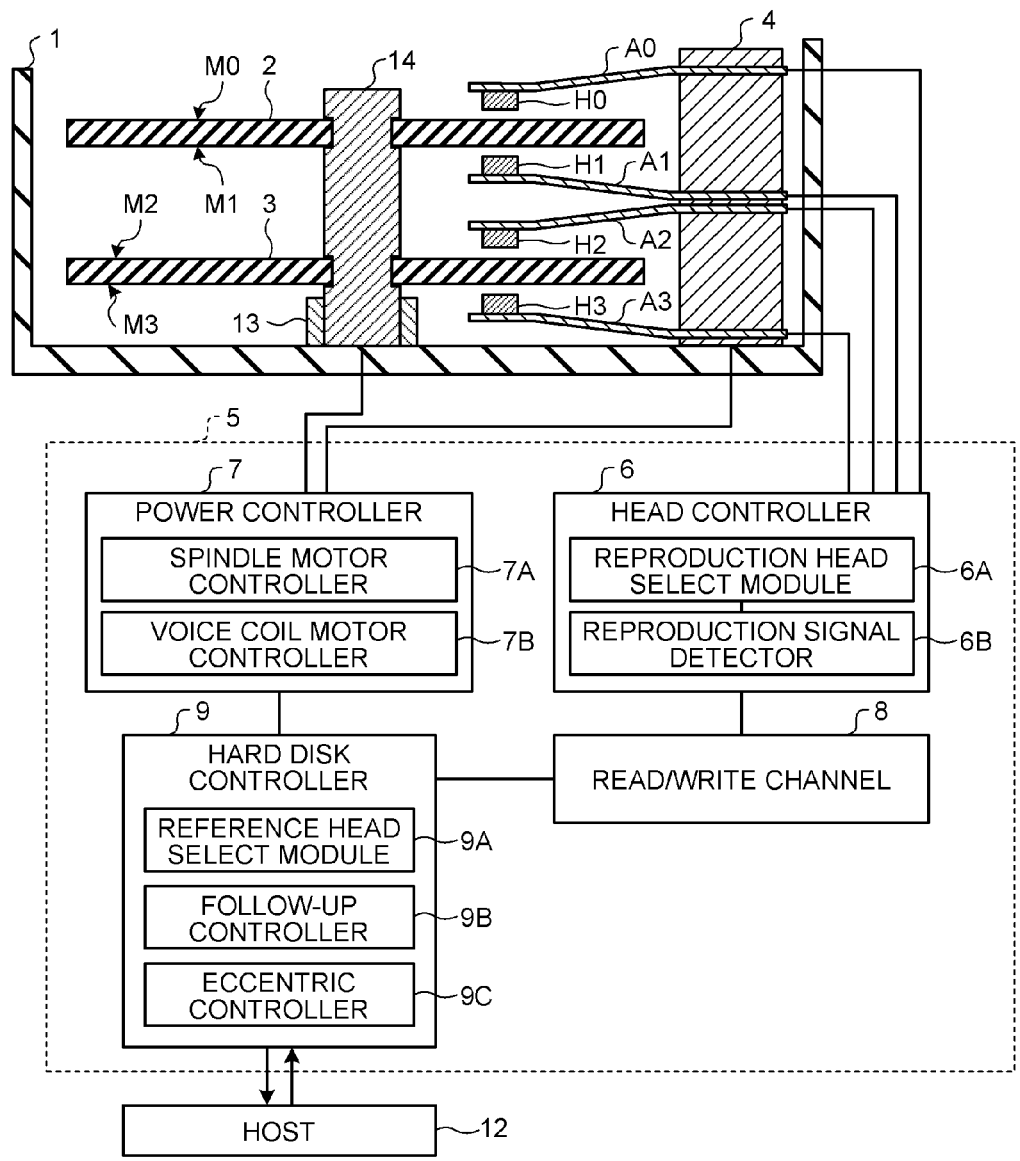
FIG. 1 is a block diagram illustrating a schematic configuration of a magnetic disk device according to a first embodiment.

FIG. 1 is a block diagram illustrating a schematic configuration of a magnetic disk device according to a first embodiment.

In FIG. 1, the magnetic disk device has plurality of magnetic disks 2 and 3. The magnetic disk 2 has disk surfaces M0 and M1 formed on both surfaces, while the magnetic disk 3 has disk surfaces M2 and M3 formed on both surfaces. The magnetic disks 2 and 3 are integrally supported by a spindle 14.

The magnetic disk device is also provided with magnetic heads H0 to H3 for each of disk surfaces M0 to M3. The magnetic heads H0 to H3 are arranged so as to face the disk surfaces M0 to M3. The magnetic heads H0 to H3 are held above and below the disk surfaces M0 to M3 by arms A0 to A3 respectively. The arms A0 to A3 can slide the magnetic heads H0 to H3 on a horizontal surface.

The magnetic disk device is also provided with a voice coil motor 4 that drives the arms A0 to A3, and a spindle motor 13 that rotates the magnetic disks 2 and 3 through the spindle 14. The voice coil motor 4 may drive the arms A0 to A3 in interlocking manner, or may drive the arms A0 to A3 independently.

The magnetic disks 2 and 3, the magnetic heads H0 to H3, the arms A0 to A3, the voice coil motor 4, the spindle motor 13, and the spindle 14 are housed in a case 1.

The magnetic disk device also includes a magnetic recording controller 5. The magnetic recording controller 5 includes a head controller 6, a power controller 7, a read/write channel 8, and a hard disk controller 9. The head controller 6 includes a reproduction head select module 6A, and a reproduction signal detector 6B. The power controller 7 includes a spindle motor controller 7A, and a voice coil motor controller 7B. The hard disk controller 9 includes a reference head select module 9A, a follow-up controller 9B, and an eccentric controller 9C.

The head controller 6 can amplify a signal during a recording and reproduction. The reproduction head select module 6A can select the magnetic heads H0 to H3 used for the reproduction. The reproduction signal detector 6B can detect the signal read by the magnetic heads H0 to H3 selected by the reproduction head select module 6A. The power controller 7 can drive the voice coil motor 4 and the spindle motor 13. The spindle motor controller 7A can control the rotation of the spindle motor 13. The voice coil motor controller 7B can control the drive of the voice coil motor 4. The read/write channel 8 can convert the signal reproduced by the magnetic heads H0 to H3 into a data form handled by a host 12, or can convert the data output from the host 12 into a signal form recorded by the magnetic heads H0 to H3. The format conversion described above includes a DA conversion or coding, for example. The read/write channel 8 can make a decoding process to the signal reproduced by the magnetic heads H0 to H3, or can make a code modulation to the data output from the host 12. The hard disk controller 9 can make a recording/reproduction control based upon an instruction from the host 12, or can sent or receive data between the host 12 and the read/write channel 8. The reference head select module 9A can select any one of the magnetic heads H0 to H3 as a reference head. The follow-up controller 9B can execute a follow-up control of the trajectory of the reference head based upon the signal read by the reference head. In the description below, the magnetic head H0 is supposed to be selected as the reference head. The eccentric controller 9C can execute an eccentric control of the trajectories of the magnetic heads H1 to H3, other than the reference head, in order to allow the eccentric error between the reference head and the magnetic heads H1 to H3 other than the reference head to be close to zero.

The magnetic recording controller 5 is connected to the host 12. The host 12 may be a personal computer that issues a writing instruction or reading instruction to the magnetic disk device, or may be an external interface.

Signals are respectively read from the disk surfaces M0 to M3 through the magnetic heads H0 to H3 with the magnetic disks 2 and 3 being rotated by the spindle motor 13, and the read signals are detected by the reproduction signal detector 6B. The signals detected by the reproduction signal detector 6B are converted into data at the read/write channel 8, and then, sent to the hard disk controller 9. The follow-up controller 9B executes a follow-up control of the trajectory of the magnetic head H0 based upon servo pattern data included in the signal detected by the reproduction signal detector 6B. The eccentric controller 9C executes an eccentric control of the trajectories of the magnetic heads H1 to H3 in order that the eccentric error between the magnetic head H0 and the magnetic heads H1 to H3 gets close to zero.

The follow-up controller 9B executes the follow-up control for the magnetic head H0, which can prevent the trajectory of the magnetic head H0 from going over a servo track. Therefore, the distortion of the signal read by the magnetic head H0 can be reduced, whereby the positioning precision of the magnetic head H0 can be enhanced. The eccentric control is executed for the magnetic heads H1 to H3 in order that the eccentric error between the magnetic head H0 and the magnetic heads H1 to H3 gets close to zero, whereby the positional error and the speed error upon seeking and changing the head can be reduced. Therefore, even in the follow-up control of the magnetic head H0, the increase in the seeking time for the process of changing and seeking the head can be reduced, whereby the degradation in the seek performance can be prevented.

Figure 2A:
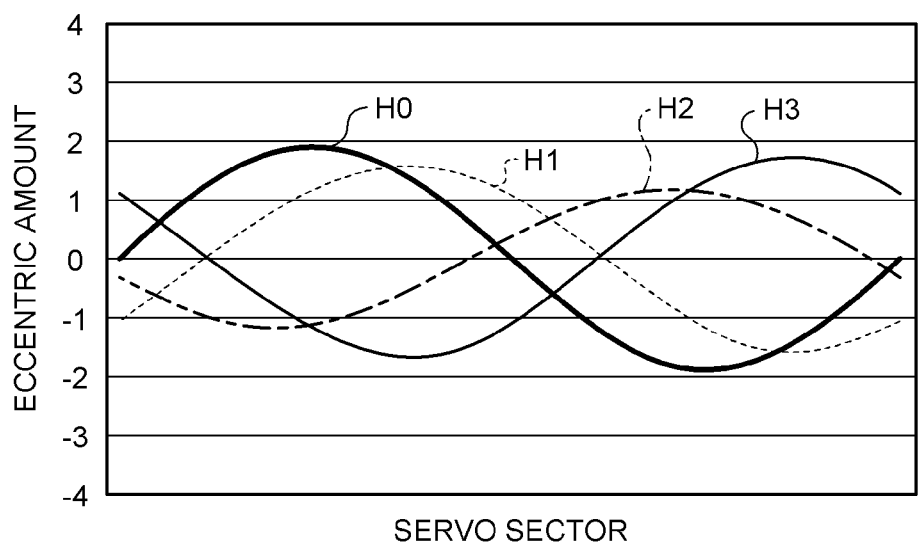
FIG. 2A is a view illustrating an eccentric amount of each magnetic head corresponding to an eccentric amount of a track on each disk surface in FIG. 1.
Figure 2B:
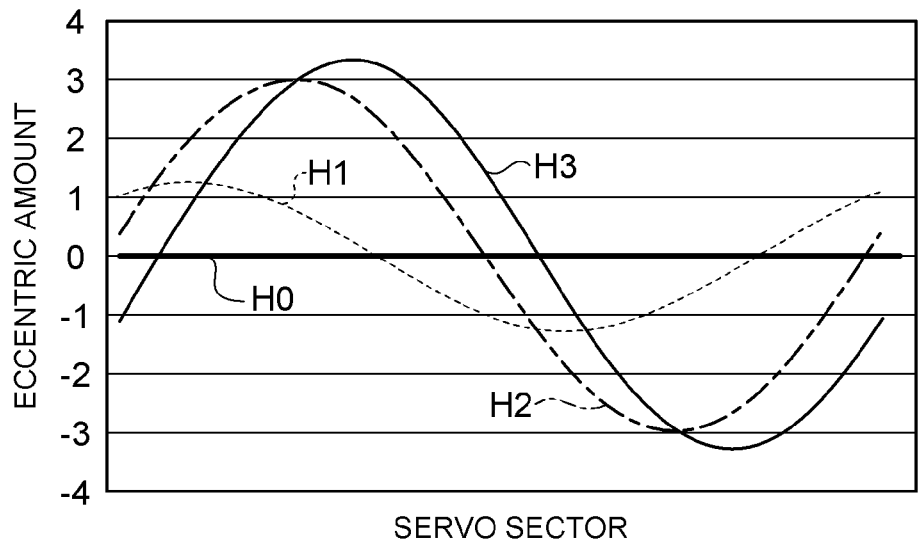
FIG. 2B is a view illustrating an eccentric amount of each magnetic head when the eccentricity of the other magnetic head to a reference head in FIG. 1 is zero.
Figure 3A:
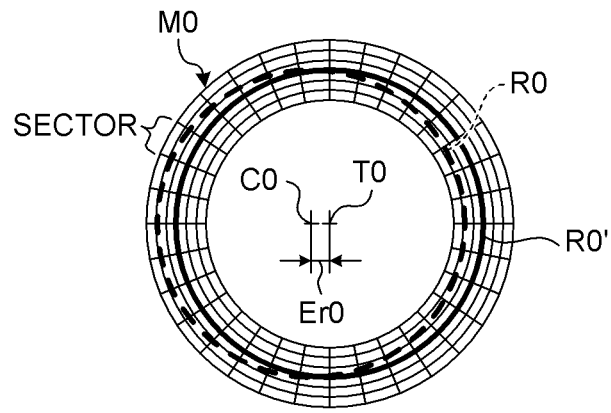
FIGS. 3A to 3D are plan views illustrating one example of a trajectory of each magnetic head on each magnetic disk in FIG. 1.
Figure 3B:
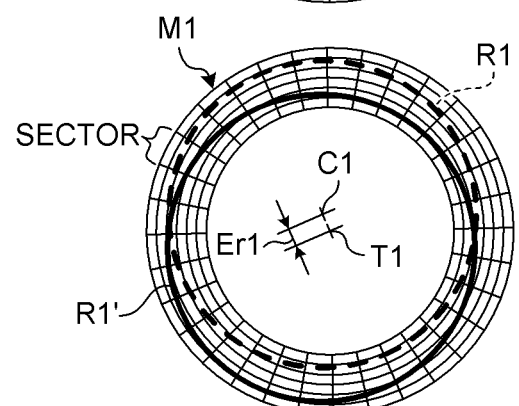
Figure 3C:
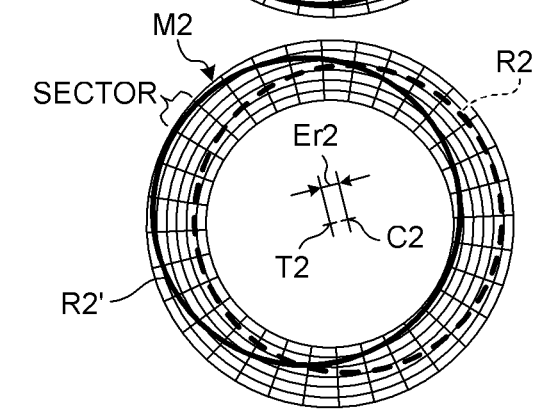
Figure 3D:
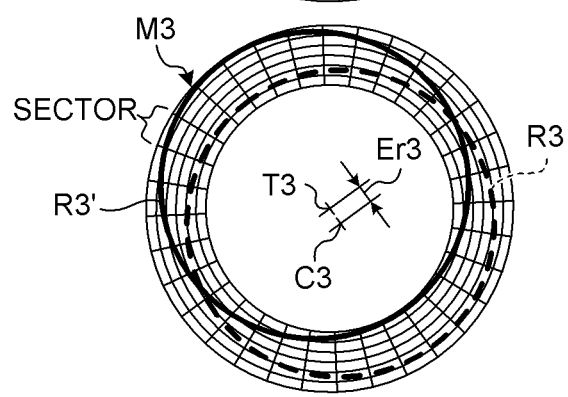

FIG. 2A is a view illustrating an eccentric amount of each magnetic head corresponding to the eccentric amount of a track on each disk surface in FIG. 1, while FIG. 2B is a view illustrating an eccentric amount of each magnetic head when the eccentricities of the other magnetic heads to the reference head in FIG. 1 is zero.

In FIG. 2A, eccentricities are generated on the trajectories of the magnetic heads H0 to H3, corresponding to the eccentricities of the tracks of the disk surfaces M0 to M3.

The magnetic head H0 is supposed to be selected as the reference head. Since the follow-up control is executed to the magnetic head H0, the eccentric amount of the magnetic head H0 becomes zero as illustrated in FIG. 2B. On the other hand, the eccentric control is executed to the magnetic heads H1 to H3 in order that the eccentric errors between the magnetic head H0 and the magnetic heads H1 to H3 get close to zero. Therefore, the eccentric amounts of the magnetic heads H1 to H3 correspond to the eccentric errors between the magnetic head H0 and the magnetic heads H1 to H3 illustrated in FIG. 2A.

FIGS. 3A to 3D are plan views illustrating one example of trajectories of the respective magnetic heads on the respective magnetic disks in FIG. 1.

In FIGS. 3A to 3D, the centers of servo tracks of the respective disk surfaces M0 to M3 are defined as T0 to T3, the centers of the rotating circle are defined as C0 to C3, and the eccentric amounts are defined as Er0 to Er3. In this case, the trajectories of the respective magnetic heads H0 to H3 become R0 to R3 according to the eccentric amounts Er0 to Er3.

On the other hand, the trajectory of the magnetic head H0 to which the follow-up control is executed becomes R0', since it is set to become a true circle with respect to the center T0 of the servo track. This trajectory R0' does not go over the servo track. The trajectories of the magnetic heads H1 to H3 become R1' to R3', respectively, since they undergo the eccentric control in order that the eccentric errors between the magnetic head H0 and the magnetic heads H1 to H3 get close to zero. These trajectories R1' to R3' go over the servo track.

FIG. 4 is a flowchart illustrating a method of calculating the trajectory of each magnetic head. In this flowchart, it is supposed that there are (Max+1) magnetic heads.

In FIG. 4, H=0 is established, and after the Hth magnetic head is sought (S1, S2), a virtual-circle-trajectory is calculated, and the calculated trajectory is stored (S3, S4). This process is repeated for all ((Max+1) magnetic heads (S5, S6).

After the virtual-circle trajectories of (Max+1) magnetic heads are obtained, the virtual-circle trajectories are corrected in order that the eccentric errors between the reference head and the respective magnetic heads become zero (S7).

Figure 5:
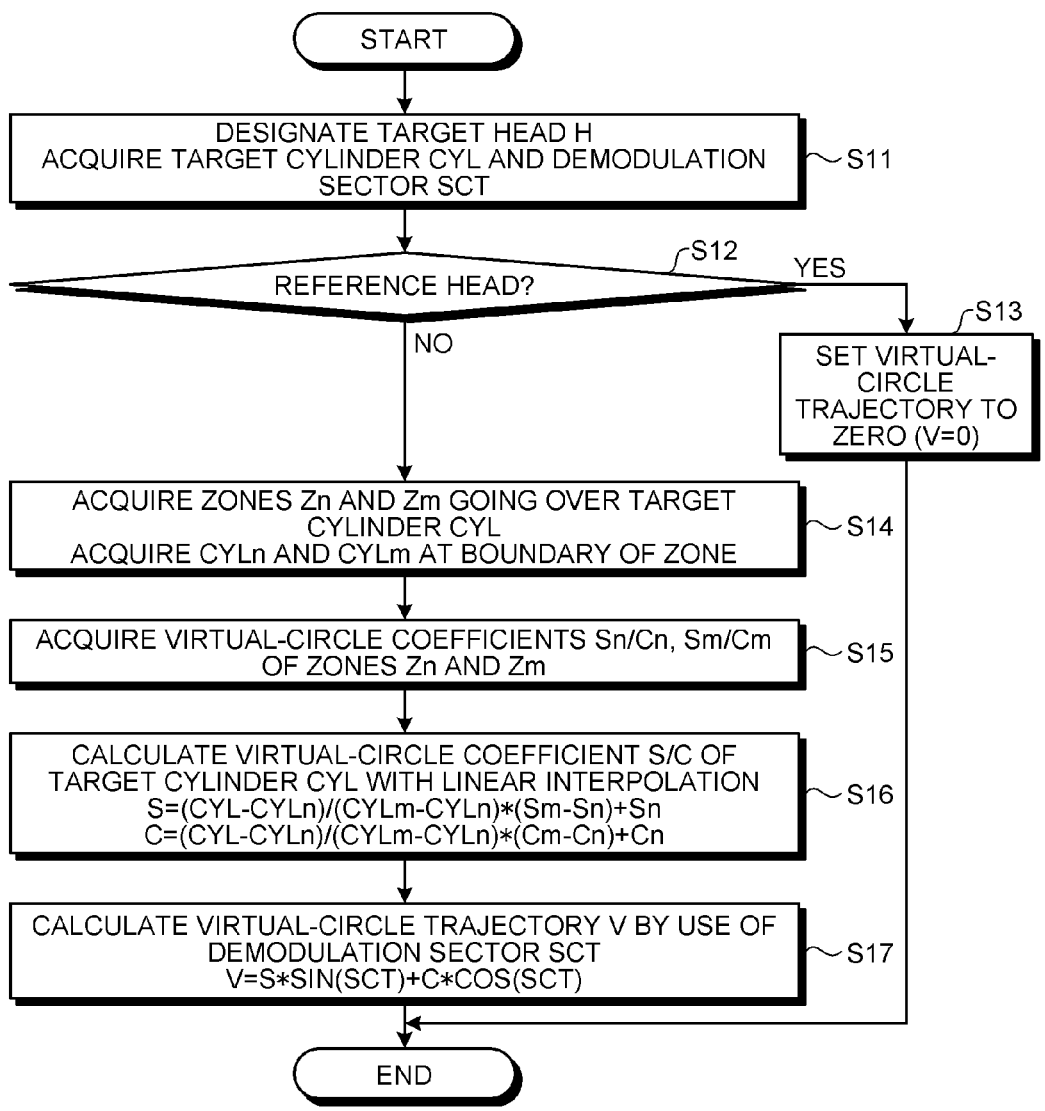
FIG. 5 is a flowchart illustrating a method of calculating a virtual-circle trajectory in FIG. 4.

FIG. 5 is a flowchart illustrating a method of calculating the virtual-circle trajectories in FIG. 4.

In FIG. 5, the Hth magnetic head is designated, and a target cylinder CYL and a demodulation sector SCT are acquired (S11). Then, it is determined whether the Hth magnetic head is the reference head (S12). If it is the reference head, the coefficient of the virtual-circle trajectory V is set to be 0 (S13).

On the other hand, if the Hth magnetic head is not the reference head, zones Zn and Zm going over the target cylinder CYL and cylinders CYLn and CYLm on the boundary of the zones Zn and Zm are acquired (S14). The zones are formed by concentrically dividing the disk surfaces M0 to M3 in a radius direction.

Virtual-circle coefficients Sn/Cn, and Sm/Cm on the respective zones Zn and Zm are acquired. Sn and Sm are cosine coefficients of the respective zones Zn and Zm, while Cn and Cm are sine coefficients of the respective zones Zn and Zm (S15).

Next, the virtual-circle coefficients Sn/Cn and Sm/Cm on the respective zones Zn and Zm are linearly interpolated, whereby the virtual-circle coefficient S/C of the target cylinder CYL is acquired (S16). The virtual-circle coefficient S/C of the target cylinder CYL can be represented by the following equations.

$$S=(CYL-CYLn)/(CYLm-CYLn)*(Sm-Sn)+Sn$$

$$C=(CYL-CYLn)/(CYLm-CYLn)*(Cm-Cn)+Cn$$

The virtual-circle trajectory V is calculated by using the demodulation sector SCT. The virtual-circle trajectory V can be represented by the following equation.

$$V=S*\mathrm{SIN}(SCT)+C*\mathrm{SOC}(SCT)$$

The virtual-circle trajectory V can be represented by the following equation 1, when it is developed for each order factor.

[Equation 1]

$$V_h(s) = \sum S_{hn} * \sin\left(\frac{s*n}{\text{sectors}}*2\pi\right) + C_{hn} * \cos\left(\frac{s*n}{\text{sectors}}*2\pi\right) \quad \text{Equation 1}$$

In the equation 1, $V_h(s)$ is the virtual-circle trajectory for each servo sector of the magnetic head h, s is a servo sector number, sectors is a number of sectors, n is an order, and $S_{hn}$ and $C_{hn}$ are virtual-circle coefficients of synchronized component on the virtual-circle trajectory.

Figures 6, 7:
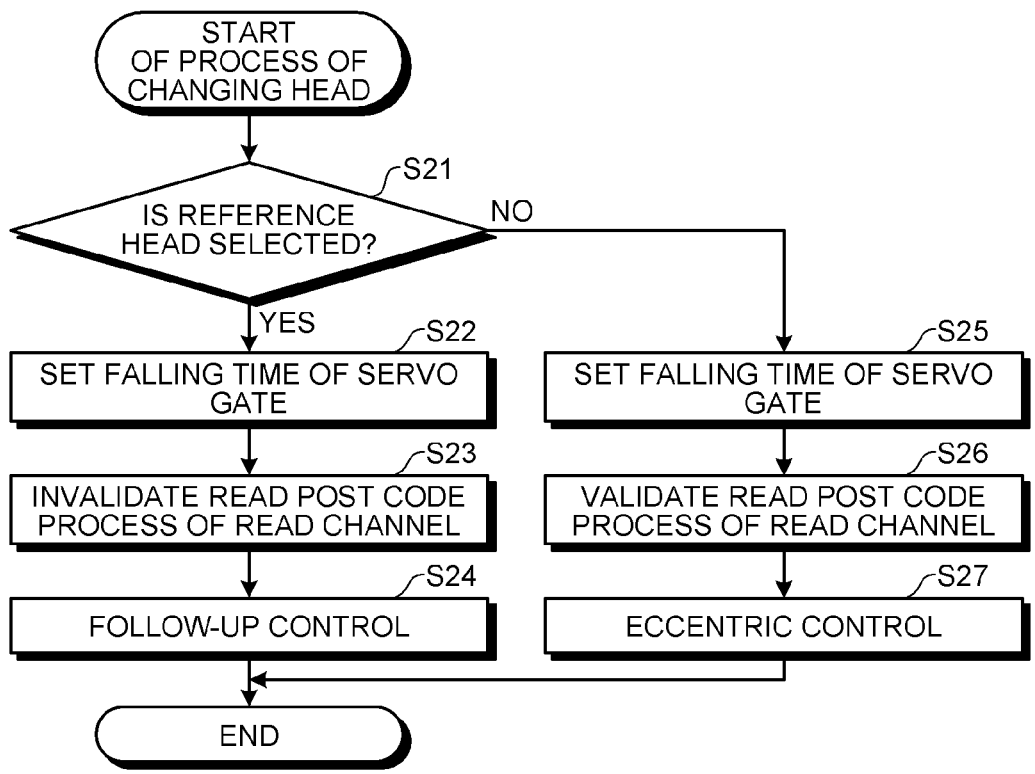
FIG. 6 is a view illustrating a list of coefficients of the virtual-circle trajectory for each zone of each magnetic head in FIG. 1.
FIG. 7 is a flowchart illustrating a process of changing a head in the magnetic disk device in FIG. 1.

FIG. 6 is a view illustrating a list of the virtual-circle coefficients of the virtual-circle trajectories for each zone of each magnetic head in FIG. 1. FIG. 6 illustrates only the first-order coefficients.

In FIG. 6, it is supposed that the disk surfaces M0 to M3 is divided into zones Z0 to Z3 respectively. In this case, virtual-circle coefficients $S_{hn}$ and $C_{hn}$ are given for each of zones Z0 to Z3 of each of the magnetic heads H0 to H3.

When the virtual-circle trajectory is corrected in order that the eccentric error with the reference head becomes zero, the virtual-circle coefficient of each magnetic head is subtracted from the virtual-circle coefficient of the reference head. For example, if the h of the reference head is supposed to be 0, the virtual-circle coefficients of the order of the reference head become $S_{0n}$ and $C_{0n}$. Therefore, the coefficients $S'_{hn}$ and $C'_{hn}$ of the trajectory, to which the eccentric control is executed for allowing the eccentric error with the reference head to become zero, can be represented by the following equations.

$$S'_{hn}=-S_{hn}+S_{0n}$$

$$C'_{hn}=-C_{hn}+C_{0n}$$

In this case, the coefficient of the trajectory of the reference head becomes zero, which means the follow-up control is executed. The eccentric control having the eccentric component same as that for the reference head can be realized for the magnetic heads other than the reference head.

FIG. 7 is a flowchart illustrating a process of changing a head in the magnetic disk device in FIG. 1.

In FIG. 7, it is determined whether the reference head is selected out of the magnetic heads H0 to H3 (S21). It is supposed here that the magnetic head H0 is the reference head, and the magnetic heads H1 to H3 are not the reference head. When the magnetic head H0 is selected, a falling time of the servo gate is set (S22), and then, a read post code process of a read channel is invalidated (S23). Then, the follow-up control of the trajectory of the magnetic head H0 is executed (S24).

On the other hand, when the magnetic heads H1 to H3 are selected, the falling time of the servo gate is set (S25), and then, the read post code process of the read channel is validated (S26). Then, the eccentric control is executed in order that the eccentric errors between the magnetic head H0 and the magnetic heads H1 to H3 become zero (S27).

Figure 8:
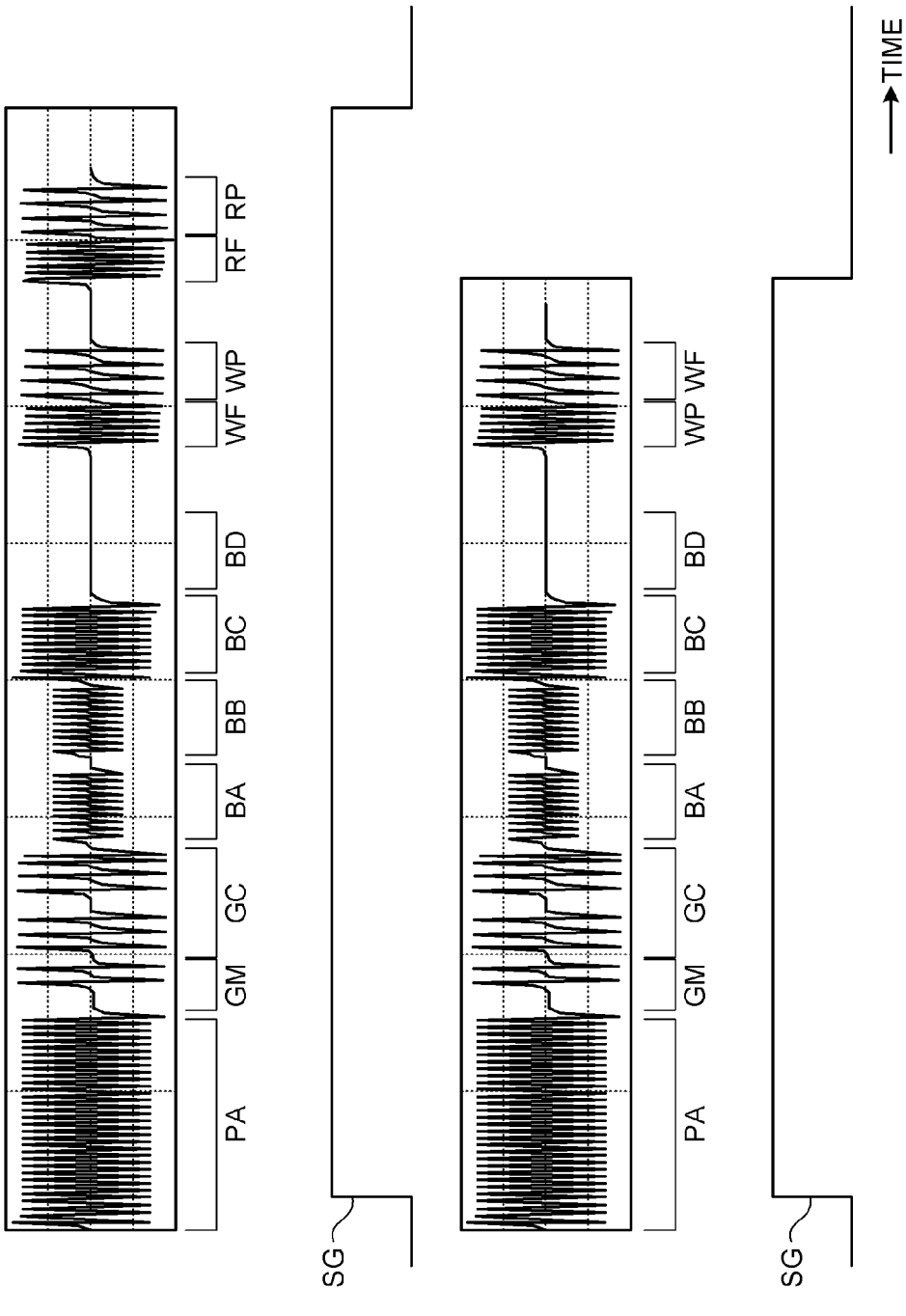
FIG. 8A is a view illustrating one example of a servo pattern when a read post code is validated.
FIG. 8B is a view illustrating a waveform of a servo gate when the read post code is validated.
FIG. 8C is a view illustrating one example of a servo pattern when the read post code is deleted.
FIG. 8D is a view illustrating a waveform of a servo gate when the read post code is deleted.

FIG. 8A is a view illustrating one example of a servo pattern when the read post code is validated, FIG. 8B is a view illustrating a waveform of a servo gate when the read post code is validated, FIG. 8C is a view illustrating one example of the servo pattern when the read post code is deleted, and FIG. 8D is a view illustrating the waveform of the servo gate when the read post code is deleted.

The servo pattern in FIG. 8A when the read post code is validated is formed with a preamble PA, a servo mark GM, a gray code GC, bursts BA, BB, BC, and BD, a write post data synchronized field WF, a write post code WP, a read post data synchronized field RF, and a read post code RP.

On the other hand, the servo pattern when the read post code is deleted is formed by eliminating the read post data synchronized field RF and the read post code RP from the servo pattern when the read post code is validated.

Therefore, in the servo pattern when the read post code is deleted, the falling time of the servo gate becomes faster by the time corresponding to the read post data synchronized field RF and the read post code RP, whereby the length of the servo gate can be decreased.

Since the read post data synchronized field RF and the read post code RP are eliminated from the servo pattern for the reference head, the data area can be increased, so that the format efficiency can be enhanced. Since the follow-up control is executed to the reference head, repeatable runout can be suppressed, even if the read post code RP is eliminated.

Figure 9:
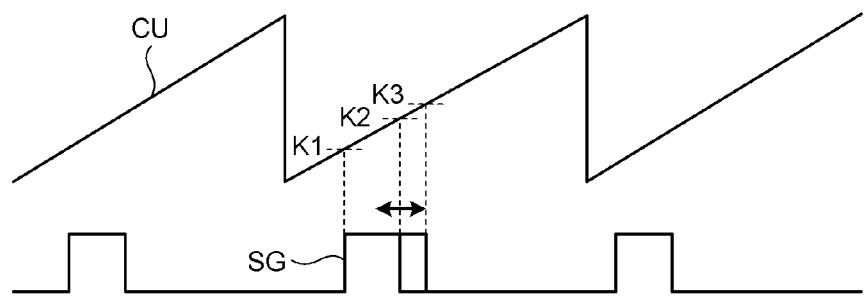
FIG. 9 is a view illustrating a method of controlling the servo gate of the magnetic disk device in FIG. 1.

FIG. 9 is a view illustrating a control method of the servo gate in the magnetic disk device in FIG. 1.

In FIG. 9, when a count value CU of a clock synchronized with the servo pattern becomes K1, the servo gate SG rises. In case where the read post code RP is deleted, the servo gate SG falls when the count value CU becomes K2. In case where the read post code RP is validated, the servo gate SG falls when the count value CU becomes K3. Therefore, the length of the servo gate can be adjusted according to the count value CU.

Figure 10:
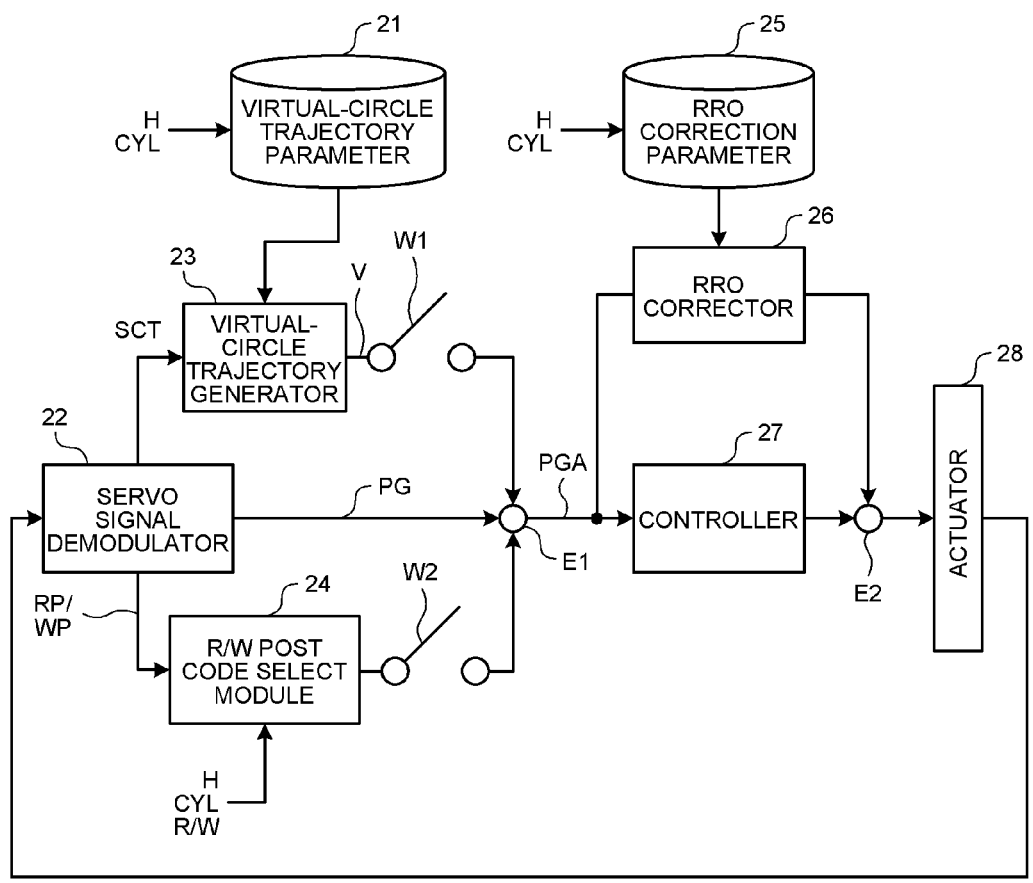
FIG. 10 is a block diagram illustrating a schematic configuration of a servo control system of the magnetic disk device in FIG. 1.

FIG. 10 is a block diagram illustrating a schematic configuration of a servo control system of the magnetic disk device in FIG. 1.

In FIG. 10, the servo control system includes a virtual-circle trajectory parameter setting module 21, a servo signal demodulator 22, a virtual-circle trajectory generator 23, a read/write post code select module 24, a RRO correction parameter setting module 25, a RRO corrector 26, a controller 27, an actuator 28, switches W1 and W2, a computing module E1, and an adder E2.

The servo pattern is input to the servo signal demodulator 22 via the actuator 28, whereby the servo signal is demodulated. A position PG is output to the computing module E1, the demodulation sector SCT is output to the virtual-circle trajectory generator 23, and the write post code WP and the read post code RP are output to the read/write post code select module 24. The position PG is a position in a radius direction of the target head H.

In the virtual-circle trajectory parameter setting module 21, the virtual-circle trajectory parameter according to the target head H and the target cylinder CYL is output to the virtual-circle trajectory generator 23. The virtual-circle trajectory generator 23 generates the virtual-circle trajectory V based upon the virtual-circle trajectory parameter and the demodulation sector SCT. The method of generating the virtual-circle trajectory V can be in accordance with the flowchart in FIG. 5.

The read/write post code select module 24 selects the write post code WP or the read post code RP in accordance with the target head H, the target cylinder CYL, and a read/write seek selecting signal R/W.

When the reference head is selected during the read, the switches W1 and W2 are turned off. When the magnetic head other than the reference head is selected, the switches W1 and W2 are turned on.

When the reference head is selected during the read, the position PG is output to the controller 27 as a position PGA via the computing module E1.

The RRO correction parameter setting module 25 outputs a RRO correction parameter according to the target head H and the target cylinder CYL to the RRO corrector 26. The RRO corrector 26 generates the RRO correcting signal based upon the position PGA.

The adder E2 adds the output from the controller 27 and the RRO correcting signal. The actuator 28 is driven based upon the result of the addition, whereby the follow-up control of the reference head is executed. Since the read post code RP is deleted for the reference head, it can be configured that the RRO corrector 26 does not execute the RRO correction during the read.

On the other hand, when the magnetic head other than the reference head is selected during the read, the read/write post code select module 24 selects the read post code RP, and the selected RP is output to the computing module E1 via the switch W2. The virtual-circle trajectory V generated by the virtual-circle trajectory generator 23 is output to the computing module E1 via the switch W1.

The computing module E1 calculates the position PGA based upon the position PG, the virtual-circle trajectory V, and the read post code RP, and the resultant is output to the controller 27. The adder E2 adds the output from the controller 27 and the RRO correction signal. The actuator 28 is driven based upon the result of the addition, whereby the eccentric control of the trajectory of the magnetic head is executed in order that the eccentric error between the reference head and the magnetic head becomes zero. The read post code RP is input to the RRO corrector 26 for the magnetic head other than the reference head. Therefore, it can be configured that the RRO corrector 27 executes the RRO correction during the read.

Second Embodiment

Figure 11:
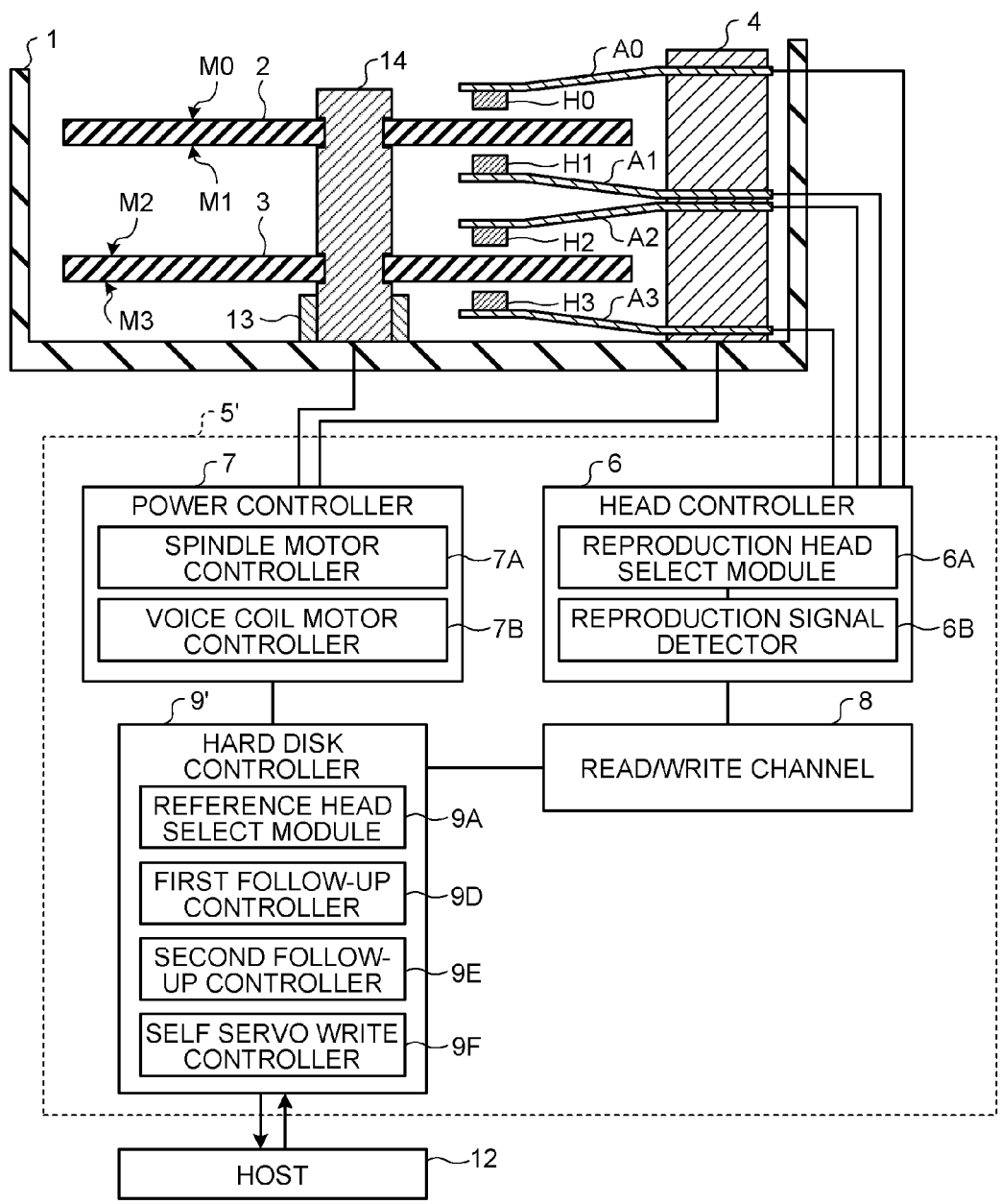
FIG. 11 is a block diagram illustrating a schematic configuration of a magnetic disk device according to a second embodiment.

FIG. 11 is a block diagram illustrating a schematic configuration of a magnetic disk device according to a second embodiment.

In FIG. 11, the magnetic disk device includes a magnetic recording controller 5' instead of the magnetic recording controller 5 of the magnetic disk device in FIG. 1. The magnetic recording controller 5' includes a hard disk controller 9' instead of the hard disk controller 9 in FIG. 1. The hard disk controller 9' includes a reference head select module 9A, a first follow-up controller 9D, a second follow-up controller 9E, and a self-servo write controller 9F.

The first follow-up controller 9D can execute a follow-up control of a trajectory of a reference head based upon a signal read by the reference head. In the description below, the magnetic head H0 is supposed to be selected as the reference head. The second follow-up controller 9E can execute the follow-up control of the trajectories of the magnetic heads H1 to H3, which are on the bank same as that of the reference head. The self-servo write controller 9F can write the serve pattern on the disk surfaces M0 to M3 via the respective magnetic heads H0 to H3.

The magnetic recording controller 5' can invalidate the read post code for the magnetic heads H0 to H3. The length of the servo gate can be shortened by the length corresponding to the invalidated read post code for the magnetic heads H0 to H3.

The self-servo write controller 9F can execute a bank write in which the servo pattern for the magnetic heads H0 to H3 are simultaneously written on the disk surfaces M0 to M3. Signals are read from the disk surfaces M0 to M3 via the magnetic heads H0 to H3 during the read, and the read signals are detected by the reproduction signal detector 6B. The signals detected by the reproduction signal detector 6B are converted into data by the read/write channel 8, and the resultant is sent to the hard disk controller 9'. In this case, the first follow-up controller 9D can execute the follow-up control of the trajectory of the magnetic head H0 based upon the servo pattern data included in the signal detected by the reproduction signal detector 6B. The second follow-up controller 9E executes the follow-up control of the trajectories of the magnetic heads H1 to H3 on the bank same as that of the reference head.

When a bank write for simultaneously writing the servo patterns of the plurality of magnetic heads H0 to H3 is mounted, the eccentricities of the magnetic heads H0 to H3 on the same bank are the same. Therefore, even when the follow-up control of the magnetic heads H0 to H3 is executed, the positional error and speed error upon seeking and changing during the head can be reduced, whereby the increase in the seeking time during the process of seeking and changing the head change can be suppressed.

The execution of the follow-up control for the magnetic heads H0 to H3 can prevent the trajectories of the magnetic heads H0 to H3 from going over the servo track. Therefore, RRO correction during the read becomes unnecessary, so that the read post code for the magnetic heads H0 to H3 can be deleted. Accordingly, the format efficiency can be enhanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such embodiments or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
   at least one magnetic disk;
   a plurality of magnetic heads for a disk surface of each magnetic disk;
   a reference head select module configured to select any one of the magnetic heads as a reference head;
   a follow-up controller configured to execute a follow-up control of a trajectory of the reference head based on a signal read by the reference head; and an eccentric control unit configured to execute an eccentric control of a trajectory of a magnetic head other than the reference head, causing an eccentric error between the trajectory of the reference head and the trajectory of the corresponding magnetic head to be effectively zero, wherein a read post code for the reference head is deleted so as to decrease a length of a servo gate for the reference head by a length corresponding to the deleted read post code.

2. The magnetic disk device of claim 1, further comprising:
a repeatable runout (RRO) corrector configured to correct a repeatable runout based upon the read post code.

3. The magnetic disk device of claim 1, wherein a coefficient of a virtual-circle control of the magnetic head is acquired, and the trajectory of eccentric control for the magnetic head other than the reference head is acquired by subtracting the coefficient of the virtual-circle control of the magnetic head other than the reference head from the coefficient of the virtual-circle control of the reference head.

4. The magnetic disk device of claim 3, wherein the coefficient of the virtual-circle control of the magnetic head is obtained for each zone.

5. A magnetic disk device comprising:
at least one magnetic disk;
a plurality of magnetic heads for a disk surface of each magnetic disk;
a reference head select module configured to select any one of the magnetic heads as a reference head;
a self-servo write controller configured to write a servo pattern on the respective disk surfaces using the respective magnetic heads;
a first follow-up controller configured to execute a follow-up control of a trajectory of the reference head based on a signal read by the reference head; and
a second follow-up controller configured to execute, for the magnetic head other than the reference head, a follow-up control of a trajectory of the magnetic head that is on a bank same as the bank of the reference head,
wherein a read post code for the reference head and the magnetic heads other than the reference head is deleted so as to decrease a length of a servo gate for the reference head and the magnetic heads other than the reference head by a length corresponding to the deleted read post code.

6. A method of controlling a head position comprising:
selecting any one of magnetic heads provided for a disk surface of each magnetic disk as a reference head;
executing a follow-up control of a trajectory of the reference head based upon a signal read by the reference head; and
executing an eccentric control of a trajectory of a magnetic head other than the reference head, causing an eccentric error between the trajectory of the reference head and the trajectory of the corresponding magnetic head to be effectively zero,
wherein a read post code for the reference head is deleted so as to decrease a length of a servo gate for the reference head by a length corresponding to the deleted read post code.

7. The method of controlling the head position of claim 6, wherein a repeatable runout is corrected based upon the read post code.

8. The method of controlling the head position of claim 6, wherein a coefficient of a virtual-circle control of the magnetic head is acquired, and the trajectory of eccentric control for the magnetic head other than the reference head is acquired by subtracting the coefficient of the virtual-circle control of the magnetic head other than the reference head from the coefficient of the virtual-circle control of the reference head.

9. The method of controlling the head position of claim 8, wherein
the coefficient of the virtual-circle control of the magnetic head is obtained for each zone.

10. A method of controlling a head position comprising:
selecting any one of magnetic heads provided for a disk surface of each magnetic disk as a reference head;
writing simultaneously a servo pattern for the magnetic heads on the disk surface by each of the magnetic heads;
executing a follow-up control of a trajectory of the reference head based upon a signal read by the reference head; and
executing, for the magnetic head other than the reference head, a follow-up control of a trajectory of the magnetic head that is on a bank same as the bank of the reference head,
wherein a read post code for the reference head and the magnetic heads other than the reference head is deleted so as to decrease a length of a servo gate for the reference head and the magnetic heads other than the reference head by a length corresponding to the deleted read post code.

* * * * *